United States Patent
Siegel et al.

(10) Patent No.: US 12,494,638 B2
(45) Date of Patent: Dec. 9, 2025

(54) SYSTEM AND METHOD OF CONTROLLING COMMUNICATION INTERFACE TO AVOID POWER DISTRIBUTION RESONANCE CONFLICT

(71) Applicant: NXP USA, INC., Austin, TX (US)

(72) Inventors: Joshua Siegel, Austin, TX (US); James Andrew Welker, Leander, TX (US); Michael Zimin, Austin, TX (US)

(73) Assignee: NXP USA, Inc., Austin, TX (US)

( * ) Notice: Subject to any disclaimer, the term of this patent is extended or adjusted under 35 U.S.C. 154(b) by 540 days.

(21) Appl. No.: 17/976,523

(22) Filed: Oct. 28, 2022

(65) Prior Publication Data

US 2024/0146053 A1    May 2, 2024

(51) Int. Cl.
*G05B 15/02* (2006.01)
*H02J 3/00* (2006.01)

(52) U.S. Cl.
CPC .............. *H02J 3/001* (2020.01); *G05B 15/02* (2013.01)

(58) Field of Classification Search
CPC ........ H02J 3/001; H02J 3/241; H02J 2203/20; G05B 15/02; G06F 13/4273; H04B 15/00; H04L 12/02
See application file for complete search history.

(56) References Cited

U.S. PATENT DOCUMENTS

| | | | |
|---|---|---|---|
| 6,781,355 B2 | 8/2004 | Gauthier et al. | |
| 6,842,351 B2 | 1/2005 | Gauthier et al. | |
| 7,043,379 B2 | 5/2006 | Gauthier et al. | |
| 8,451,913 B2 | 5/2013 | Oh et al. | |
| 8,766,647 B2 | 7/2014 | Leibowitz et al. | |
| 11,054,891 B2 | 7/2021 | Popovich et al. | |
| 2014/0244947 A1* | 8/2014 | Song | G06F 13/1694 711/154 |
| 2015/0089315 A1* | 3/2015 | Alcocer Ochoa | H04L 25/4906 714/746 |
| 2020/0310520 A1 | 10/2020 | Badrieh et al. | |
| 2022/0229579 A1* | 7/2022 | Badrieh | G11C 29/50008 |

OTHER PUBLICATIONS

Anonymous, "NOP (code)", Wikipedia, Aug. 20, 2022, retrieved from https://en.wikipedia.org/w/index.php?title=NOP_(code)&oldid=1105577347 on Feb. 27, 2024.

* cited by examiner

*Primary Examiner* — Yuhui R Pan (57) ABSTRACT

A resonance avoidance system including a resonance avoidance controller configured to insert a delay between sequential transactions on a communication interface separated by an inactive period to avoid stimulating a power distribution network resonance. The resonance avoidance controller may be configured to insert the delay by delaying a second transaction from being driven onto the communication interface after a first transaction in which the delay is sufficient to avoid stimulating the power distribution network resonance. The delay may be inserted by delaying a driver from driving the second transaction by the sufficient delay. The conflict may be detected between first and second commands in a command queue, in which the delay may be inserted by inserting no operation commands between the commands in the command queue. Operational timing values may be stored that are used to detect resonant frequency conflicts.

17 Claims, 4 Drawing Sheets

| NUMBER OF NO-OP CYCLES (UI's) @ 3733 MT/s | 4 | 8 | 12 | 16 | 20 | 24 | 28 | 32 |
|---|---|---|---|---|---|---|---|---|
| COMMAND LENGTH (UI's) @ 3733 MT/s | 16 | 16 | 16 | 16 | 16 | 16 | 16 | 16 |
| UNIT INTERVAL AKA UI (ps) @ 3733 MT/s | 268 | 268 | 268 | 268 | 268 | 268 | 268 | 268 |
| EFFECTIVE FREQUENCY OF STIMULATION (MHz) | 187 | 155 | 133 | 117 | 104 | 93 | 85 | 78 |

401

| NUMBER OF NO-OP CYCLES (UI's) @ 3733 MT/s | 4 | 8 | 12 | 16 | 20 | 24 | 28 | 32 |
|---|---|---|---|---|---|---|---|---|
| COMMAND LENGTH (UI's) @ 3733 MT/s | 32 | 32 | 32 | 32 | 32 | 32 | 32 | 32 |
| UNIT INTERVAL AKA UI (ps) @ 3733 MT/s | 268 | 268 | 268 | 268 | 268 | 268 | 268 | 268 |
| EFFECTIVE FREQUENCY OF STIMULATION (MHz) | 104 | 93 | 85 | 78 | 72 | 67 | 62 | 58 |

402

| NUMBER OF NO-OP CYCLES (UI's) @ 2800 MT/s | 4 | 8 | 12 | 16 | 20 | 24 | 28 | 32 |
|---|---|---|---|---|---|---|---|---|
| COMMAND LENGTH (UI's) @ 2800 MT/s | 16 | 16 | 16 | 16 | 16 | 16 | 16 | 16 |
| UNIT INTERVAL AKA UI (ps) @ 2800 MT/s | 357 | 357 | 357 | 357 | 357 | 357 | 357 | 357 |
| EFFECTIVE FREQUENCY OF STIMULATION (MHz) | 175 | 140 | 117 | 100 | 87 | 78 | 70 | 64 |

403

| NUMBER OF NO-OP CYCLES (UI's) @ 2800 MT/s | 4 | 8 | 12 | 16 | 20 | 24 | 28 | 32 |
|---|---|---|---|---|---|---|---|---|
| COMMAND LENGTH (UI's) @ 2800 MT/s | 32 | 32 | 32 | 32 | 32 | 32 | 32 | 32 |
| UNIT INTERVAL AKA UI (ps) @ 2800 MT/s | 357 | 357 | 357 | 357 | 357 | 357 | 357 | 357 |
| EFFECTIVE FREQUENCY OF STIMULATION (MHz) | 100 | 87 | 78 | 70 | 64 | 58 | 54 | 50 |

SYSTEM AND METHOD OF CONTROLLING COMMUNICATION INTERFACE TO AVOID POWER DISTRIBUTION RESONANCE CONFLICT

FIELD OF THE INVENTION

The present invention relates in general to a communication systems, and more particularly to a system and method of controlling a communication interface to avoid a conflict with power distribution resonance.

DESCRIPTION OF THE RELATED ART

Certain combinations of communication activity on a communication interface may stimulate the system power distribution network (PDN) at its resonant frequency, causing an impact on the supply voltage provided to on-die circuitry driving the communication interface and potentially causing substantial degradation in the quality of the signalling on the communication interface. The power distribution network resonance stimulation may cause interference on the communication interface, which may cause the interface to suffer single bit errors or multibit errors or may even cause the communication interface to fail altogether.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

As described herein, a "resonance conflict" occurs when an effective frequency of an event in circuitry is sufficiently close to the resonant frequency of the power distribution network (PDN) to cause stimulation of the PDN resonance. Such resonance conflict is particularly disadvantageous on a communication interface, since stimulation of the PDN resonance may cause interference on the communication interface that causes the communication interface to suffer single bit errors or multibit errors or may even cause the communication interface to fail altogether. Conventional methods have been used to resolve the PDN resonance stimulation issue. Such conventional methods, however, are costly, complex, or generally undesirable for a variety of reasons.

One conventional approach is to increase the amount of on-die power supply decoupling capacitance, which increases die area and cost. Another conventional approach is improving parasitic power supply inductance of the semiconductor package, which often results in changing to a higher cost package or appropriating resources from other power supplies. Another conventional approach is adding package decoupling capacitors, which adds significant cost to the customer bill of materials (BOM) or is often not feasible depending on the ball-grid array pitch of the configuration. Another conventional approach is improving the board level parasitic power supply inductance, which means, in practice, either increasing layer count or re-organizing the stack-up with additional cost and complexity. Another conventional approach is slowing down the communication interface altogether to shift away from resonant frequency stimulation of the PDN, which negatively impacts performance.

A system and method of controlling a communication interface to avoid the PDN resonance conflict as described herein prevents errors or failures otherwise caused by stimulation of PDN resonance by intentionally avoiding the combination of activation and inactivation on the communication interface that has an effective frequency that is at or near the resonant frequency of the power distribution network.

Figure 1:
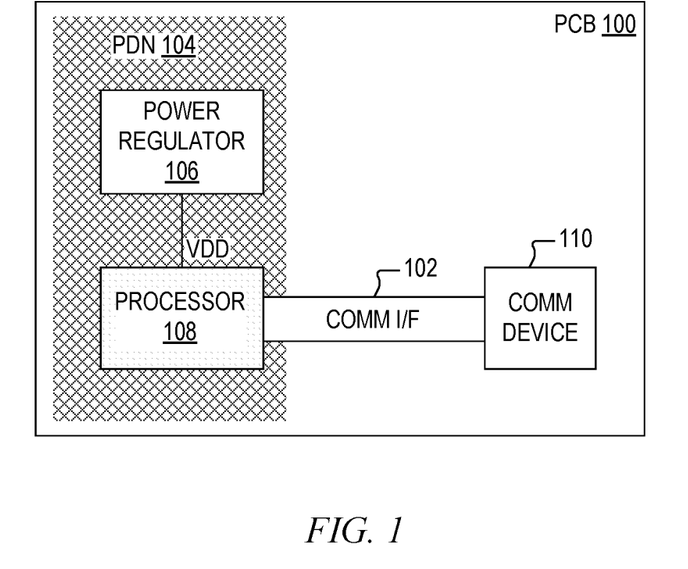
FIG. 1 is a simplified block diagram of a communication interface provided on a printed circuit board configured with a power distribution network (PDN).

FIG. 1 is a simplified block diagram of a communication interface (COMM I/F) 102 provided on a printed circuit board (PCB) 100 configured with a power distribution network (PDN) 104. A power regulator 106 is provided on the PCB 100 to provide power to various components and devices also provided on or within the PCB 100. As shown, for example, the power regulator 106 generates a supply voltage VDD provided to a supply input of a processor 108. The communication interface 102 is coupled between the processor 108 and a communication device 110 also mounted on the PCB 100 to enable communications between the processor 108 and the communication device 110.

The processor 108 may be configured in any suitable manner depending upon the application and corresponding implementation, such as a multiprocessor, a microprocessor, a micro-processing unit (MPU), a microcontroller, a central processing unit (CPU), etc., or any other type of processing circuitry that may be known or further developed. The communication device 110 may be any type of device, such as a bus controller, a peripheral device, a memory system, a bridge interface, etc. As an example, a memory system may be implemented according to any type of random-access memory (RAM), which may include a double data rate (DDR) memory such as a DDR synchronous dynamic RAM (SDRAM) class of memory or the like. Although the communication device 110 may also receive power from the power regulator 106, it is not shown within the PDN 104 and thus may be powered separately by other power circuitry (not shown).

The PDN 104 is depicted as a shaded area which generally represents distribution of power on the PCB 100 by the power regulator 106. The PDN 104 incorporates the conductive traces on one or more layers of the PCB 100 along with conductive vias and the like for distributing supply voltage and current on the PCB 100. The PDN 104 also represents the physical and electrical characteristics of power distribution, such as physical or inherent resistances, capacitances, and inductances that have either or both electrical influence and electromagnetic interference on power distribution and the devices receiving power. The processor 108, for example, is also depicted with shading to illustrate that the PDN 104 is distributed throughout and thus effectively permeates the processor 108 and its circuitry. In addition, since coupled to the processor 108, the communication interface 102 is depicted with shading to illustrate impact of the PDN 104 on communications that occur on the communication interface 102.

The PDN 104 has a resonant frequency $F_{PDN}$. As described further herein, communications on the communication interface 102 between the processor 108 and the communication device 110 that operate at or sufficiently near $F_{PDN}$ may stimulate the PDN 104, which may cause substantial degradation in the supply voltage to the on-die circuitry of the processor 108 and thereby on the quality of the signalling on the communication interface 102. Such stimulation and interference can cause the communication interface 102 to suffer single bit errors, multibit errors, or to fail altogether. A system and method of controlling a communication interface to avoid stimulating power distribution resonance as described herein prevents these errors or failures by intentionally avoiding the combination of activation and inactivation at or sufficiently near the resonant frequency $F_{PDN}$ of the PDN 104.

Figure 2:
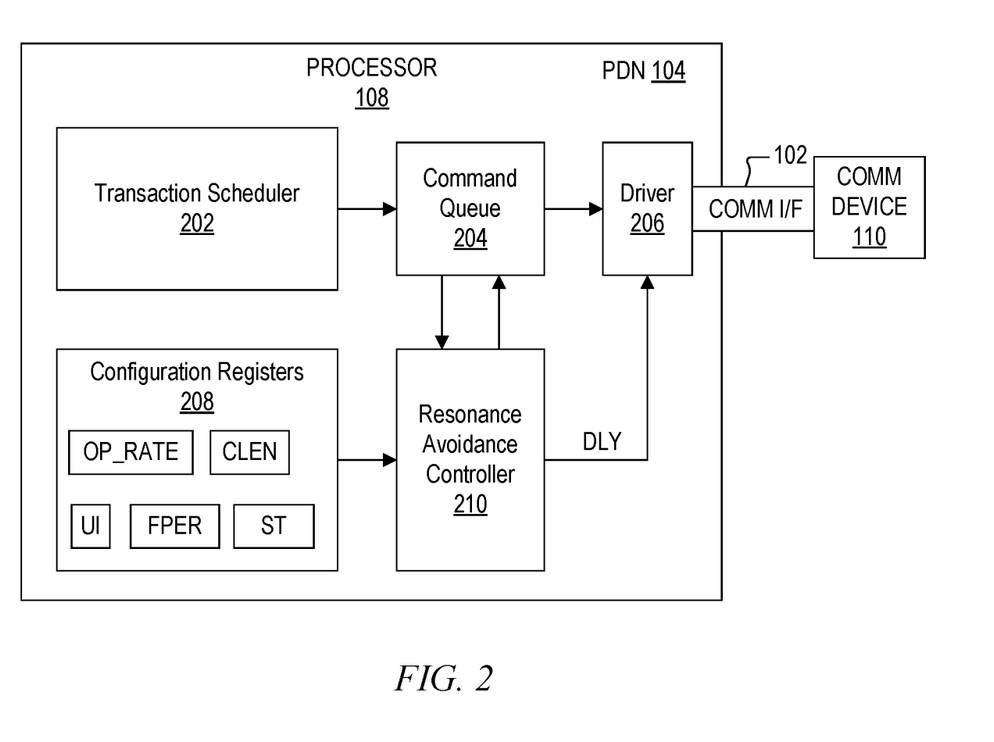
FIG. 2 is a simplified block diagram of the processor coupled to the communication interface of FIG. 1 according to one embodiment, in which the communication interface is coupled to the communication device of FIG. 1.

FIG. 2 is a simplified block diagram of the processor 108 coupled to the communication interface 102 according to one embodiment, in which the communication interface 102 is coupled to the communication device 110. The illustrated processor 108 includes a transaction scheduler 202, a command queue 204, a driver 206 (which may further include arbitration circuitry), a set of configuration registers 208, and a resonance avoidance controller 210. The illustrated processor 108 is also shown shaded to represent distribution of the PDN 104 throughout the integrated or semiconductor chip structure of the processor 108 including its attachment method to the PCB 100 (e.g., ball-grid array or the like). In one embodiment, the command queue 204 may include a first-in, first-out (FIFO) buffer or the like (not shown) filled with commands and any other information to be asserted on the communication interface 102. The transaction scheduler 202 monitors operation of the processor 108 and fills the command queue 204 with the commands and other information for carrying out the functions of the processor 108 as it relates to the communication device 110. When the communication device 110 is configured as a memory system, for example, the commands may include write operations along with address and data information for storing data or for retrieving stored data. The driver 206 retrieves commands and other information from the command queue 204 and asserts the retrieved information onto the communication interface 102.

It is noted that a system and method of controlling a communication interface as described herein is not limited to communications with a memory system but may be applied to any type communication interface with many other types of communication devices.

The configuration registers 208 store parameters associated with operation of the processor 108 including timing parameters. The timing parameters may include an operating rate (OP_RATE) of the processor 108 and the communication interface 102 expressed in units based on the particular configuration. In one embodiment, OP_RATE is expressed terms of mega-transfers per second per bit (MT/s). The OP_RATE value may be related to the operating speed or clock frequency dictating transfer operations on the communication interface 102. Example values of OP_RATE include 2800 and 3733, although any other suitable value may be used depending upon the particular configuration. The timing parameters may include a unit-interval (UI) value which may be the reciprocal of the OP_RATE with corresponding suitable units. In one embodiment, for OP_RATE expressed in units of MT/s, UI may be expressed in appropriate time units such as, for example, picoseconds (ps). For an OP_RATE value of 3733 MT/s, UI may have a value of 1/3733e6≈286 ps. For an OP_RATE value of 2800 MT/s, UI may have a value of 1/2800e6≈357 ps. Alternative values are contemplated. The timing parameters may include a command length (CLEN) of the commands expressed in UI units, such as 16 UIs or 32 UIs or the like. The timing parameters may include a resonant frequency period value FPER indicative of a period of the resonant frequency $F_{PDN}$ of the PDN 104. The timing parameters may include a separation time (ST) value relative to the period of the resonant frequency $F_{PDN}$ that may be used to determine the amount of delay to be inserted to ensure avoidance of resonance conflict.

The resonance avoidance controller 210 may use one or more of the timing parameters to identify a resonance conflict condition with the resonant frequency $F_{PDN}$ of the PDN 104. In the general case, a resonance conflict condition occurs when a time interval between sequential transactions of a communication interface separated by a period of inactivity presents an effective frequency between the sequential transactions that is equal to or sufficiently close to the resonant frequency $F_{PDN}$ of the PDN 104. In other words, the time interval between the sequential transactions separated by inactivity is at or near the period of the resonant frequency $F_{PDN}$ of the PDN 104. In the illustrated configuration, a resonance conflict condition occurs when a time interval between sequential commands asserted on the communication interface 102 separated by one or more inactive cycles, or no operation (no-op) commands, presents an effective frequency between the sequential commands that is equal to or sufficiently close to the resonant frequency $F_{PDN}$ of the PDN 104. In the illustrated embodiment, the resonance avoidance controller 210 monitors the command queue 204 to identify potential resonance conflicts based on the identified resonance conflict condition.

In general, the effective frequency between the sequential transactions may have an effective period EP. If FPER represents a period of the resonant frequency $F_{PDN}$ of the PDN 104 and if ST represents a separation time relative to FPER, then a resonance conflict occurs when the difference between EP and FPER is less than ST, or when (FPER−ST) <EP<(FPER+ST). When a resonance conflict is detected, a delay DEL is added between the sequential transactions to move the effective period to an adjusted effective period AEP outside of the resonance conflict range, so that EP+DEL=AEP>(FPER+ST). It is appreciated that if EP is about equal to (FPER−ST) and since delay always increases the effective period between successive transactions, then the DEL may be as high as 2*ST (e.g., FPER−ST+ 2*ST=FPER+ST).

Suppose, for example, that FPER has a value of 10 representing a period of 10 nanoseconds (ns) of a resonant frequency $F_{PDN}$ of the PDN 104 equal to 100 megahertz (MHz). Also, assume that OP_RATE is 3733 MT/s so that UI is about 268 ps and that the command length is 16 UIs. In this example, if first and second sequential commands within the command queue 204 are separated by 20 no-ops of one UI each, then the time interval between the commands is 16+20=36 UI's multiplied by 268 ps=9.65 nanoseconds (ns), having an effective frequency of 1/9.65 ns 104 MHz. The effective frequency of the first and second sequential commands separated by 20 UI's is about 104 MHz, which is sufficiently close to $F_{PDN}$ of the PDN 104=100 MHz to cause a resonance conflict that may interfere with the transactions asserted on the communication interface 102. It is noted that rather than comparing frequency, the resonance avoidance controller 210 may compare the difference between the period of the resonant frequency with the period of the effective frequency for more directly determining the delay to be inserted. Thus, it may be determined that a period of 9.65 (ns) of the effective frequency of the sequential commands is sufficiently close to the period of 10 (ns) of the resonant frequency.

When the resonance avoidance controller 210 identifies potential resonance conflicts in the command queue 204, it may take remedial action to avoid the conflict. In the general case, the resonance avoidance controller 210 inserts a delay between sequential activity to increase the inactive period to avoid an effective frequency at or near the resonant frequency of the PDN 104. The ST value may be used to determine the amount of delay that may be needed to increase the period of the effective frequency to avoid the resonance conflict. The ST may represent a worst-case condition when the time interval between sequential transactions separated by inactivity exactly matches the period of $F_{PDN}$. The ST value may be determined experimentally or empirically for a given configuration to adjust the period of the effective frequency by a sufficient amount to ensure that stimulation of the PDN 104 avoids errors of the communication interface 102.

In one embodiment, the resonance avoidance controller 210 revises the entries in the FIFO of the command queue 204, such as by inserting one or more additional no-ops between the resonance conflicting sequential commands. First, the resonance avoidance controller 210 determines a difference in time between the period of the effective frequency of the potentially conflicting transactions or commands and the period of $F_{PDN}$ as indicated by or otherwise determined from FPER. Second, the resonance avoidance controller 210 compares the time difference with ST to determine a minimum time differential representing the minimum amount of adjustment to avoid conflict. Third, the resonance avoidance controller 210 selects a number of no-ops that equals or exceeds the minimum time differential and inserts the requisite number of no-ops between the sequential transactions. In the example above, the resonance avoidance controller 210 may insert an additional 8 no-ops for a total of 28 no-ops to achieve a period of 12 ns corresponding with an effective frequency of about 85 MHz, which is sufficiently separated from the resonant frequency of 100 MHz to minimize or otherwise substantially reduce the potential resonance interference.

In another embodiment, the resonance avoidance controller 210 may directly control the driver 206 to insert a delay between sequential commands to avoid resonance conflict. The resonance avoidance controller 210 may still monitor the command queue 204 to identify when commands are output to be driven onto the communication interface 102 by the driver 206. In addition, as shown, the resonance avoidance controller 210 may assert a delay (DLY) signal to the driver 206, causing the driver 206 to pause between successive commands to avoid a resonance conflict. The amount of delay to insert may be determined based on ST in a similar manner previously described. In this case, however, the time differential may be inserted directly rather than first converting to a corresponding number of no-ops. The driver 206 may pause for an indicated amount of time, such as while the DLY signal is asserted, to implement the delay. In the example described previously, the resonance avoidance controller 210 may assert the DLY signal after completion of the first command and before completion of the second command for an amount of time determined by the resonance avoidance controller 210 to minimize the potential resonance interference.

Figure 3:
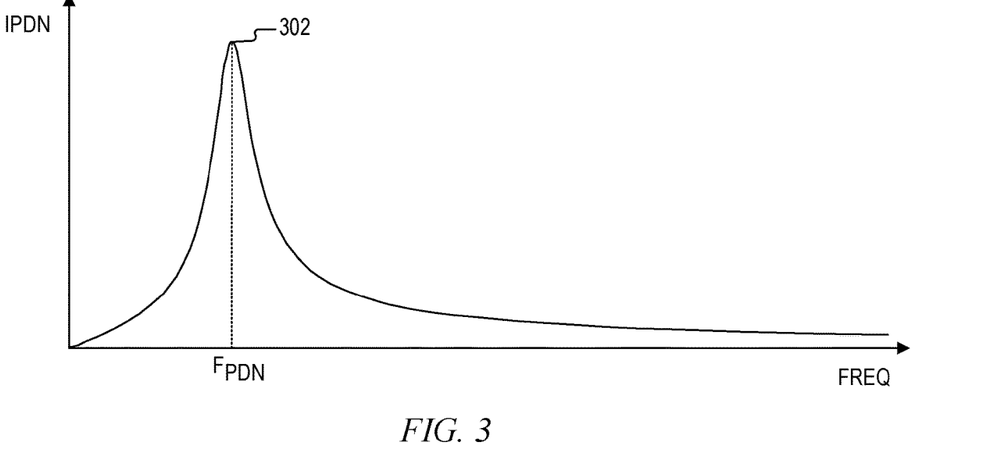
FIG. 3 is a graphic diagram plotting impedance versus frequency of the PDN of FIG. 1.

FIG. 3 is a graphic diagram plotting impedance of the PDN 104 (IPDN) versus frequency (FREQ). Frequency is measured in an applicable factor of Hertz, such as MHz or the like. A frequency $F_{PDN}$ occurs when IPDN reaches a peak value as shown at 302. $F_{PDN}$ may be determined by simulation, experimentally or empirically during testing of the PCB 100. Once known, the FPER value is determined and stored for copying into a corresponding one of the configuration registers 208 during operation. The resonance avoidance controller 210 accesses and uses this value as previously described to avoid resonance conflicts with the PDN 104.

Figure 4:
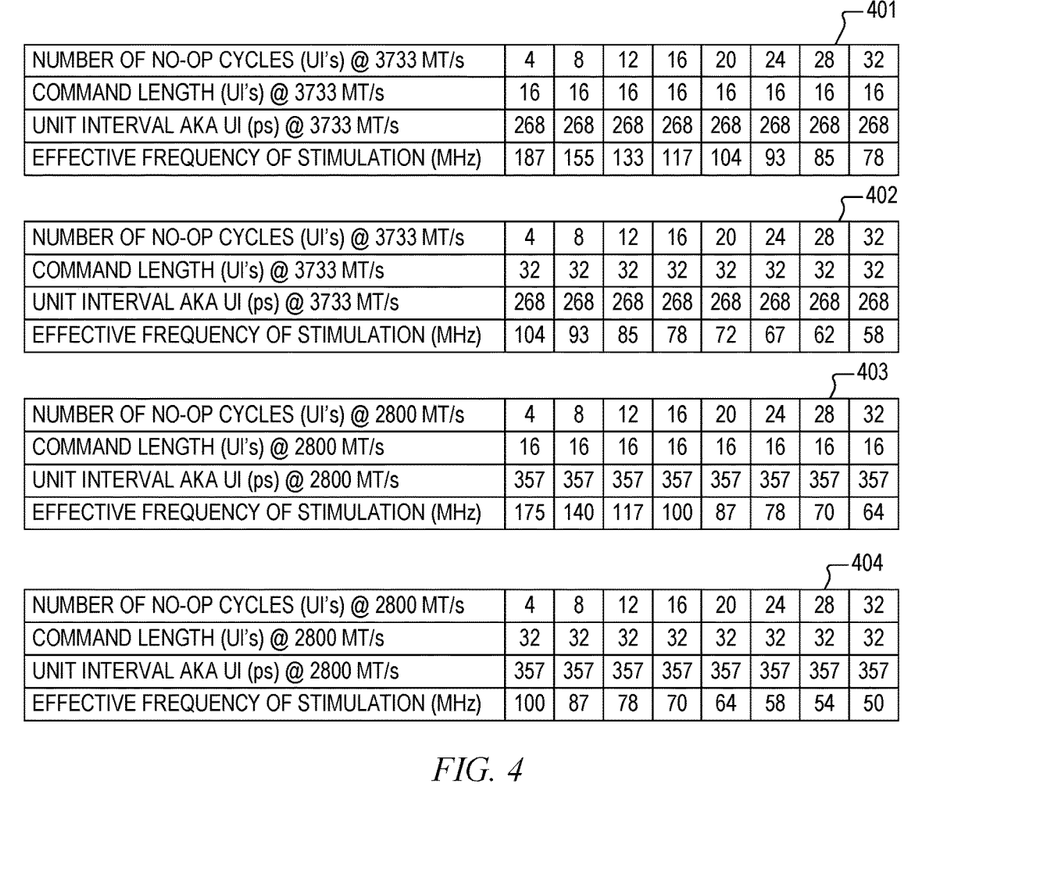
FIG. 4 is a series of tables illustrating examples of determining the effective frequency of stimulation for different operation conditions of the processor and communication interface of FIG. 1 according to one embodiment.

FIG. 4 is a series of tables 401, 402, 403, and 404 illustrating examples of determining the effective frequency of stimulation for different operation conditions of the processor 108 and communication interface 102 according to one embodiment. The first two tables 401 and 402 list values for an operating rate of 3733 MT/s with a UI of about 268 ps, and the second two tables 403 and 404 list values for an operating rate of 2800 MT/s with a UI of about 357 ps. The first and third tables 401 and 403 list values for a command length the 16 UI's and the second and fourth tables 402 and 404 list values for a command length of 32 UI's. Each of the tables 401-404 list an effective frequency value in MHz for each of a different number of no-op cycles measured in UI's. In the last table 404, for example, the effective frequency of stimulation is 100 MHz for 2800 MT/s with 4 no-ops. The specific values listed are exemplary only and determined for a particular implementation and may be different for different configurations and implementations.

Figure 5:
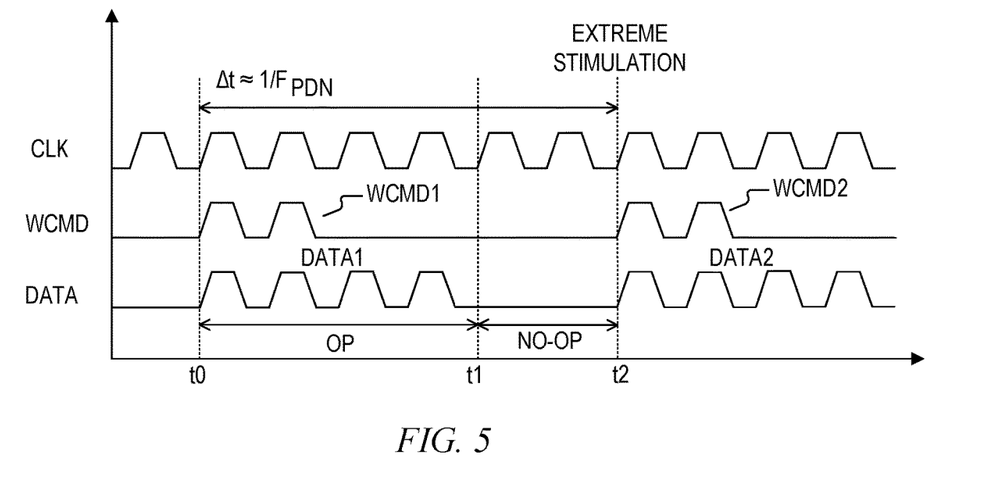
FIG. 5 is a timing diagram plotting transaction signals on the communication interface of FIG. 1 illustrating extreme stimulation of the PDN potentially resulting in resonance conflict according to one embodiment in which the communication interface is configured as a memory interface.

FIG. 5 is a timing diagram plotting transaction signals on the communication interface 102 illustrating extreme stimulation of the PDN 104 potentially resulting in resonance conflict according to one embodiment. In this example, the transactions are memory write transaction signals for the case in which the communication device 110 is in the form of a memory system and the communication interface 102 is a memory interface such as a memory bus or the like. Alternative configurations of the communication interface 102 and the communication device 110 are contemplated in which the present disclosure is not limited to memory transactions. The plotted signals include a clock signal CLK, a toggling signal representing a write command WCMD, and a toggling signal representing DATA to be written. The address may be incorporated within the write command or asserted on separate signals. A first write command WCMD1 and corresponding data DATA1 is asserted onto the communication interface 102 beginning at a time to. The data DATA1 of the first write command completes at a subsequent time t1, which is followed by inactivity from time t1 to a time t2. The period of inactivity may be filled with any number of no-op cycles. A second write command WCMD2 and corresponding data DATA2 is asserted onto the communication interface 102 beginning at time t2. In this case, the elapsed time between times to and t2 is a delta time Δt which is approximately equal to $1/F_{PDN}$ of the PDN 104. In this manner, the first and second sequential commands WCMD1 and WCMD2 separated by a period of inactivity with start times having a time interval at or near the $F_{PDN}$ of the PDN 104 causes a resonance conflict with the PDN 104. This situation represents an extreme stimulation event of the PDN 104 which may cause bit errors or even failure of the transactions being asserted on the communication interface 102.

Figure 6:
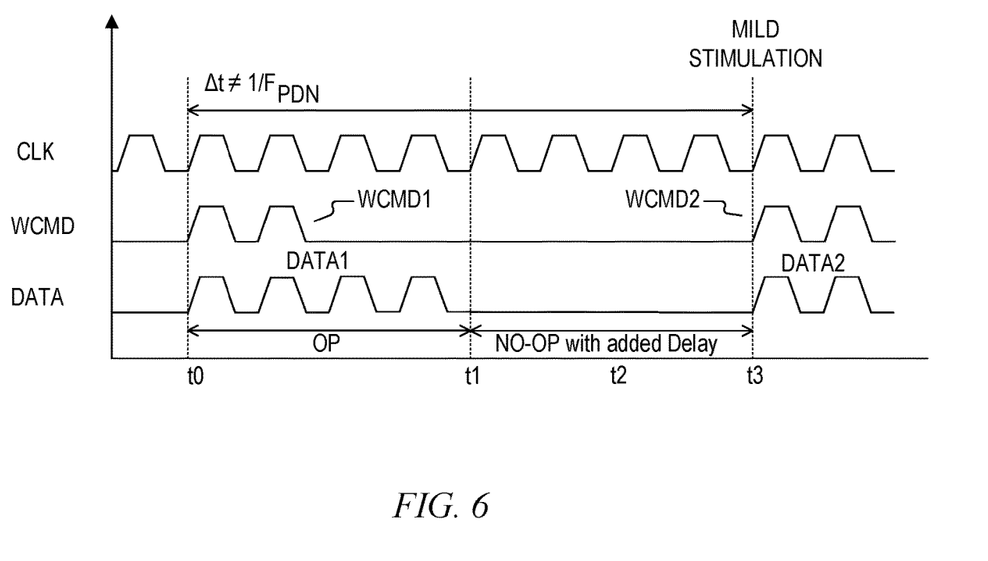
FIG. 6 is a timing diagram plotting memory transaction signals that may be asserted on the communication interface illustrating mild stimulation of the PDN of FIG. 1 that avoids resonance conflict according to one embodiment.

FIG. 6 is a timing diagram plotting memory transaction signals that may be asserted on the communication interface 102 illustrating mild stimulation of the PDN 104 that avoids resonance conflict according to one embodiment. The same signals as FIG. 5 are plotted, including the clock signal CLK, the write commands WCMD1 and WCMD1 and corresponding data signals DATA1 and DATA2, respectively. In this case, however, the second write command WCMD2 and corresponding data DATA2 are not asserted onto the communication interface 102 at time t2 but instead are delayed until a subsequent time t3. The resonance avoidance controller 210 either inserts additional no-ops or delays the driver 206 by a time difference between times t2 and t3. In this case, the elapsed time between times t0 and t3 is a delta time Δt which is substantially different from $1/F_{PDN}$ of the PDN 104. This situation represents a mild stimulation event of the PDN 104 thereby avoiding bit errors or even failure of the transactions being asserted on the communication interface 102.

Resonance avoidance, such as performed by the resonance avoidance controller 210, is configured to adjust operation to intentionally avoid stimulating the system at or near $F_{PDN}$. Programmable control of the duration of inactivity between sequential commands prevents the combination(s) of activity and inactivity which might otherwise combine to create a time period approximately equal to the time period corresponding to $F_{PDN}$. Resonance avoidance enables a communication interface to operate at a higher speed or at the same speed but with a less costly power distribution network. The relative impact varies depending on many factors. For example, in a DDR memory system, most data are transmitted via streaming in which commands are executed back-to-back without intermediate periods of inactivity. Such streaming does not pose a problematic scenario since although many bits can switch, not all the possible bits switch, so that resonance avoidance does not need to modify the most common transactions.

Figure 7:
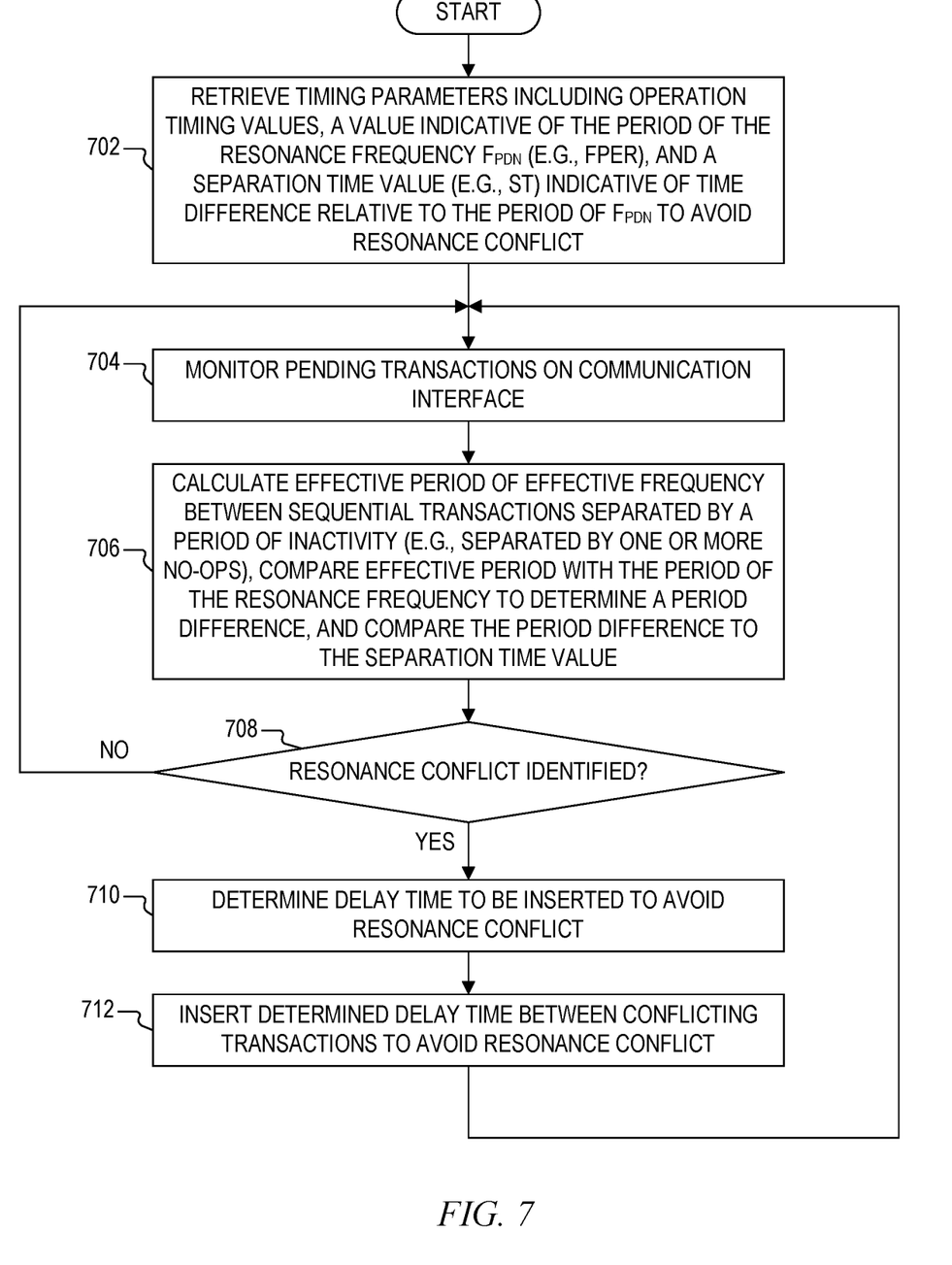
FIG. 7 is a flowchart diagram illustrating operation of the resonance avoidance controller of FIG. 2 according to one embodiment.

FIG. 7 is a flowchart diagram illustrating operation of the resonance avoidance controller 210 according to one embodiment. At a first block 702, after power-on or reset (POR), the resonance avoidance controller 210 retrieves timing parameters including operation timing values, a value indicative of the period of the resonance frequency $F_{PDN}$ (e.g., FPER), and a separation time value (e.g., ST) relative to the period of $F_{PDN}$ to avoid resonance conflict. For the processor 108 shown in FIG. 2, for example, the timing parameters OP_RATE, CLEN, UI, FPER, and ST may be retrieved from the configuration registers 208. Operation advances to block 704, in which the resonance avoidance controller 210 monitors pending transactions of the communication interface 102. As previously described, the resonance avoidance controller 210 may monitor the commands or other transactions in the command queue 204.

At next block 706, the "effective period" of the effective frequency between each pair of sequential transactions that are separated by a period of inactivity (e.g., two commands separated by one or more no-ops) is calculated. The effective period is then compared with the period of the resonance frequency to determine a period difference. Each period difference reflects the frequency difference between the effective frequency of a corresponding pair of sequential transactions and the resonance frequency $F_{PDN}$. The calculated period difference is then compared to the separation time value, such as ST in the illustrated embodiment of FIG. 2.

At next block 708, it is queried whether any resonance conflicts are identified in the pending transactions. As previously described, a resonance conflict is identified when a pair of sequential transactions or commands separated by inactivity also having a time interval at or near the period of $F_{PDN}$. Each calculated period difference that is equal to or greater than the separation time value means that stimulation is sufficiently mild so that correction by added delay is not necessary. When no conflicts are identified, then operation loops back to block 704. The resonance avoidance controller 210 may continuously loop between blocks 704, 706, and 708 until a resonance conflict is identified.

When any calculated period difference is less than the separation time value, then the corresponding stimulation may be sufficiently disruptive and represents a resonance conflict. When a resonance conflict is identified as determined at block 708, operation advances instead to block 710 in which a delay time is determined that avoids the resonance conflict when inserted between the identified sequential transactions that would otherwise have a conflicting effective frequency. The added delay represents changing the effective period to more than FPER+ST to avoid resonance conflict. As previously described, since delay is always added to increase the effective period between the sequential transactions, the added delay may be as much as 2*ST, such as when the initial effective period is about equal to FPER−ST.

At next block 712, the delay time is inserted between the conflicting transactions to avoid the resonance conflict. In one embodiment, if the delay time is effectuated by inserting no-ops between commands, then a number of no-ops is determined having a total delay time that equals or exceeds the minimum amount of delay time to achieve a period of at least PPER+ST, and that number of no-ops is inserted between the conflicting commands, such as, for example, within the command queue 204. In another embodiment, the minimum time period is added by simply delaying the second transaction, such as, for example, delaying the driver 206 after the first command before allowing the second command to be asserted onto the communication interface 102. After the delay is inserted, operation loops back to block 704 to continue monitoring the pending transactions. Operation repeats in this manner during operation.

In most communication interface configurations, only a minor latency impact occurs when resonance avoidance is enabled or otherwise applicable. In particular, it is rare in most configurations to transact a small amount of data and then start another transfer a short time later, which may be referred to as "bubble" transactions. These relatively rare bubble transactions are likely to cause the resonance conflict scenario that can pathologically stimulate the power distribution network at its resonant frequency, which can lead to errors in or failure of the communication interface. Nonetheless, since such transactions are rare, the overall latency impact to avoid resonance conflict is expected to be minimal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage or error levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A resonance avoidance system, comprising:
a power distribution network configured to distribute supply voltage, wherein the power distribution network has a power distribution network resonance; and
processing circuitry coupled to the power distribution network, comprising:
a driver that drives transactions onto a communication interface; and
a resonance avoidance controller that is configured to insert a delay between sequential transactions separated by an inactive period to avoid stimulating the power distribution network resonance,
wherein the resonance avoidance controller is configured to insert the delay by delaying a second transaction from being driven onto the communication interface after a first transaction when a time interval between respective start times of the first and second transactions separated by the inactive period is within a predetermined separation time of a period of the power distribution network resonance.

2. The resonance avoidance system of claim 1, wherein the resonance avoidance controller is configured to insert the delay by inserting one or more inactive cycles between the sequential transactions.

3. The resonance avoidance system of claim 1, wherein the resonance avoidance controller is configured to insert the delay by delaying the driver between the sequential transactions.

4. The resonance avoidance system of claim 1, wherein the resonance avoidance controller is configured to detect a resonance conflict between a first command and a second command scheduled within a command queue, and to insert the delay by inserting at least one no operation command in the command queue between the first command and the second command.

5. The resonance avoidance system of claim 1, wherein the resonance avoidance controller is configured to calculate an effective period of an effective frequency of the sequential transactions, to compare the effective period with a period of the power distribution network resonance to determine a period difference, and to detect a resonance conflict based on the period difference.

6. A resonance avoidance system, comprising:
a power distribution network configured to distribute supply voltage, wherein the power distribution network has a power distribution network resonance; and
processing circuitry coupled to the power distribution network, comprising:
a driver that drives transactions onto a communication interface; and
a resonance avoidance controller that is configured to insert a delay between sequential transactions separated by an inactive period to avoid stimulating the power distribution network resonance,
wherein the resonance avoidance controller is configured to retrieve operational timing values from a configuration circuit, to use the operational timing values to calculate a time interval between respective start times of first and second transactions, and to detect a resonance conflict based on comparing the time interval with a resonant frequency period value.

7. A resonance avoidance system, comprising:
a power distribution network configured to distribute supply voltage, wherein the power distribution network has a power distribution network resonance; and
processing circuitry coupled to the power distribution network, comprising:
a driver that drives transactions onto a communication interface; and
a resonance avoidance controller that is configured to insert a delay between sequential transactions separated by an inactive period to avoid stimulating the power distribution network resonance,
wherein the resonance avoidance controller is configured to retrieve operational timing values from a configuration circuit, to use the operational timing values to calculate an effective frequency of stimulation based on a time interval between start times of first and second transactions, and to detect a resonance conflict based on comparing the effective frequency of stimulation with a resonant frequency period value.

8. A processing system, comprising:
a printed circuit board;
a power regulator provided on the PCB that drives a supply voltage via a power distribution network, wherein the power distribution network has a resonant frequency;
a communication interface provided on the PCB; and
processing circuitry coupled to the power distribution network, comprising:
a driver that drives sequential commands onto the communication interface; and
a resonance avoidance controller that is configured to insert a delay between sequential transactions separated by an inactive period to avoid a resonance conflict between an effective frequency of the sequential transactions and the resonant frequency of the power distribution network,
wherein the resonance avoidance controller is configured to insert the delay by delaying a second transaction from being driven onto the communication interface after a first transaction.

9. The processing system of claim 8, wherein the resonance avoidance controller is configured to insert the delay by inserting one or more inactive cycles between the sequential transactions.

10. The processing system of claim 8, wherein the resonance avoidance controller is configured to insert the delay by delaying the driver between the sequential transactions.

11. The processing system of claim 8, wherein the resonance avoidance controller is configured to detect the resonance conflict between a first command and a second command scheduled within a command queue, and to insert the delay by inserting at least one no operation command in the command queue between the first command and the second command.

12. A processing system, comprising:
a printed circuit board;
a power regulator provided on the PCB that drives a supply voltage via a power distribution network, wherein the power distribution network has a resonant frequency;
a communication interface provided on the PCB; and
processing circuitry coupled to the power distribution network, comprising:
a driver that drives sequential commands onto the communication interface; and
a resonance avoidance controller that is configured to insert a delay between sequential transactions separated by an inactive period to avoid a resonance conflict between an effective frequency of the sequential transactions and the resonant frequency of the power distribution network,
wherein the resonance avoidance controller is configured to retrieve operational timing values from a configuration circuit, to use the operational timing values to calculate a time interval between respective start times of first and second transactions, and to detect the resonance conflict based on comparing the time interval with a resonant frequency period value.

13. A method of avoiding stimulation of a power distribution network resonance, comprising:
detecting a resonance conflict between the power distribution network resonance and an effective frequency of sequential transactions on a communication interface separated by an inactive period; and
inserting a delay between the sequential transactions to avoid stimulating the power distribution network resonance,
wherein the inserting a delay comprises delaying a second transaction from being driven onto the communication interface after a first transaction when a time interval between respective start times of the first and second transactions separated by the inactive period is within a predetermined separation time of a period of the power distribution network resonance.

14. The method of claim 13, wherein the inserting a delay comprises inserting one or more inactive cycles between the sequential transactions.

15. The method of claim 13, wherein the inserting a delay comprises delaying a driver that drives transactions onto the communication interface between the sequential transactions.

16. The method of claim 13, wherein the detecting a resonance conflict comprises:
calculating an effective period of an effective frequency of the sequential transactions;
comparing the effective period with a period of the power distribution network resonance to determine a period difference; and
detecting the resonance conflict based on the period difference.

17. A method of avoiding stimulation of a power distribution network resonance, comprising:
detecting a resonance conflict between the power distribution network resonance and an effective frequency of sequential transactions on a communication interface separated by an inactive period; and
inserting a delay between the sequential transactions to avoid stimulating the power distribution network resonance,
wherein the detecting a resonance conflict comprises:
retrieving operational timing values from a configuration circuit;
using the operational timing values to calculate a time interval between respective start times of first and second transactions; and
comparing the time interval with a resonant frequency period value.

* * * * *